(No Model.) 5 Sheets—Sheet 1.

J. A. CROCKER.
WINDOW SCREEN.

No. 563,948. Patented July 14, 1896.

WITNESSES:
E. A. Woodbury
J. N. Ponney

INVENTOR
James Allen Crocker
BY
Henry Williams
ATTORNEY.

(No Model.) 5 Sheets—Sheet 2.

J. A. CROCKER.
WINDOW SCREEN.

No. 563,948. Patented July 14, 1896.

WITNESSES:
E. A. Woodbury
A. N. Pomeroy

INVENTOR
James Allen Crocker
BY
Henry W. Williams
ATTORNEY.

(No Model.) 5 Sheets—Sheet 3.
J. A. CROCKER.
WINDOW SCREEN.

No. 563,948. Patented July 14, 1896.

WITNESSES: INVENTOR
James Allen Crocker
BY
ATTORNEY.

(No Model.)  5 Sheets—Sheet 4.

J. A. CROCKER.
WINDOW SCREEN.

No. 563,948. Patented July 14, 1896.

WITNESSES:
E. A. Woodbury
A. N. Pomroy

INVENTOR
James Allen Crocker
BY
Henry W. Williams
ATTORNEY.

(No Model.)  5 Sheets—Sheet 5.
J. A. CROCKER.
WINDOW SCREEN.
No. 563,948. Patented July 14, 1896.
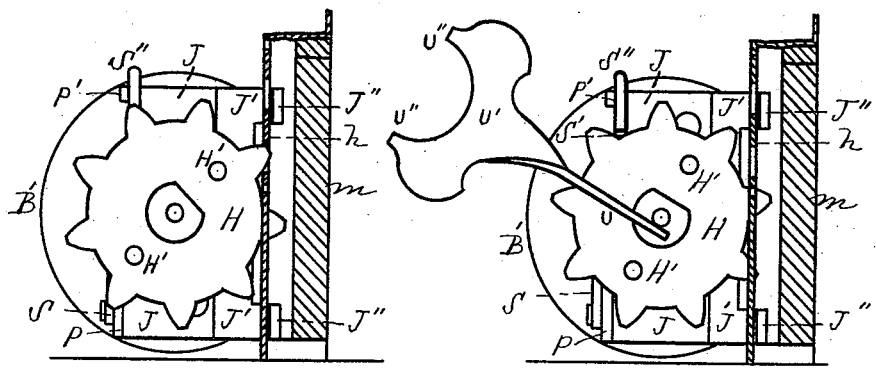
Fig. 5.  Fig. 6.
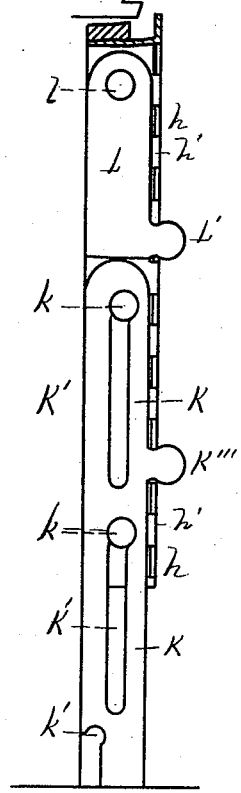
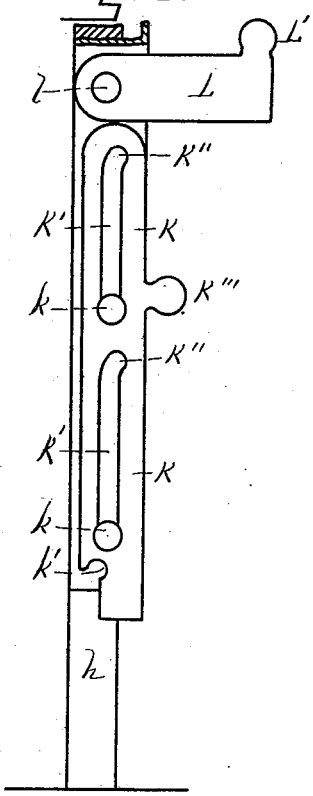
Fig. 7.  Fig. 8.
WITNESSES:
E. A. Woodbury
A. N. Pinney.
INVENTOR
James Allen Crocker
BY
Henry Williams
ATTORNEY.

UNITED STATES PATENT OFFICE.

JAMES ALLEN CROCKER, OF BOSTON, MASSACHUSETTS, ASSIGNOR TO THE INTERNATIONAL ROLLING SCREEN COMPANY, OF SAME PLACE.

WINDOW-SCREEN.

SPECIFICATION forming part of Letters Patent No. 563,948, dated July 14, 1896.

Application filed October 16, 1895. Serial No. 565,836. (No model.)

*To all whom it may concern:*

Be it known that I, JAMES ALLEN CROCKER, a citizen of the United States, residing at Boston, in the county of Suffolk and State of Massachusetts, have invented new and useful Improvements in Window-Screens, of which the following is a specification.

This invention relates to that class of window-screens which are adapted to unwind or unroll when the window-sash is raised and to fit or protect the space produced thereby for the purpose of preventing the entrance of insects into the apartment, an example of a window-screen in such class being the invention for which Letters Patent No. 525,381 were granted to Samuel Abbott, September 4, 1894; and the invention is intended to be an improvement upon the window-screen illustrated and described in my application for Letters Patent of the United States filed January 24, 1895, and allowed April 19, 1895, Serial No. 536,054, to which reference is made.

The improvement relates especially to the construction and arrangement of parts hereinafter described, whereby the tension is locked and released, whereby the casing or roll is secured in position in the window-casing and released therefrom, and to certain details of construction whereby the device is perfected in its operation.

The nature of the improvement is fully described below, and illustrated in the accompanying drawings, in which—

Figure 1:
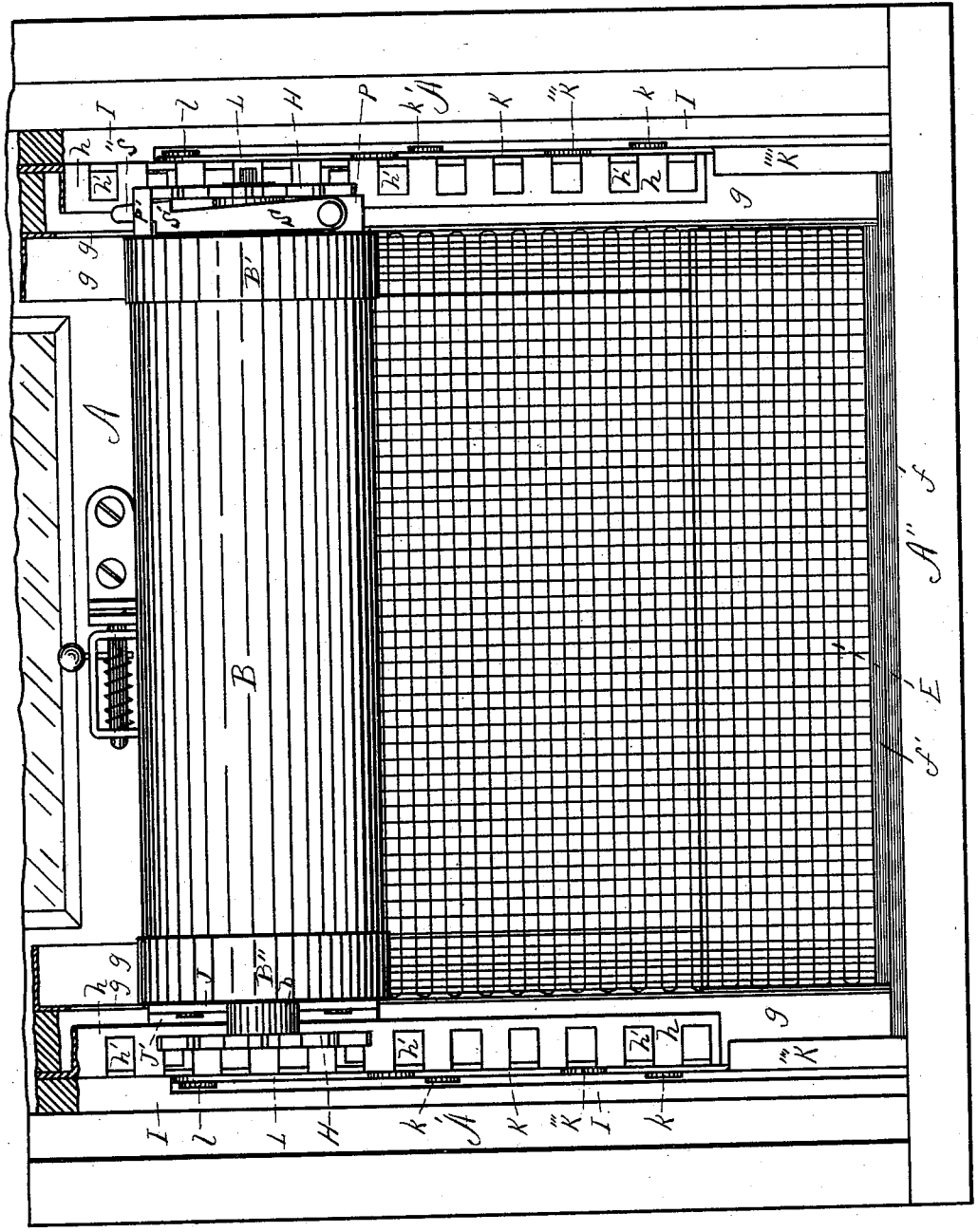
Figure 2:
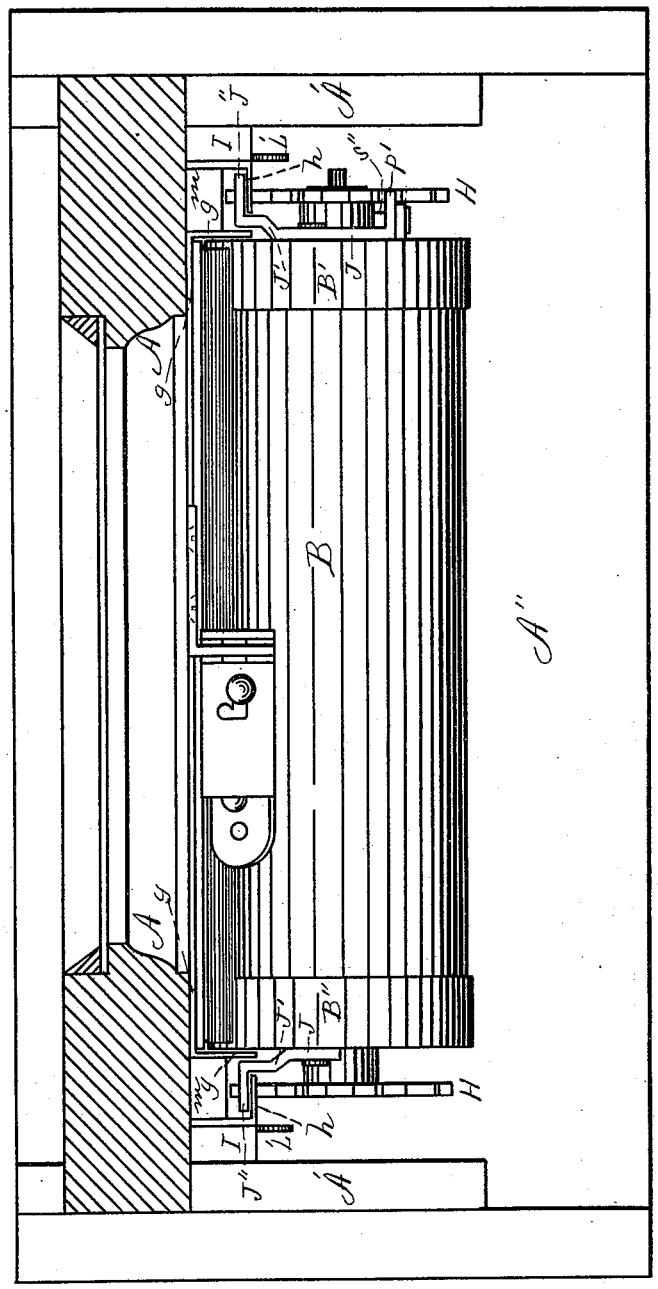
Figure 3:
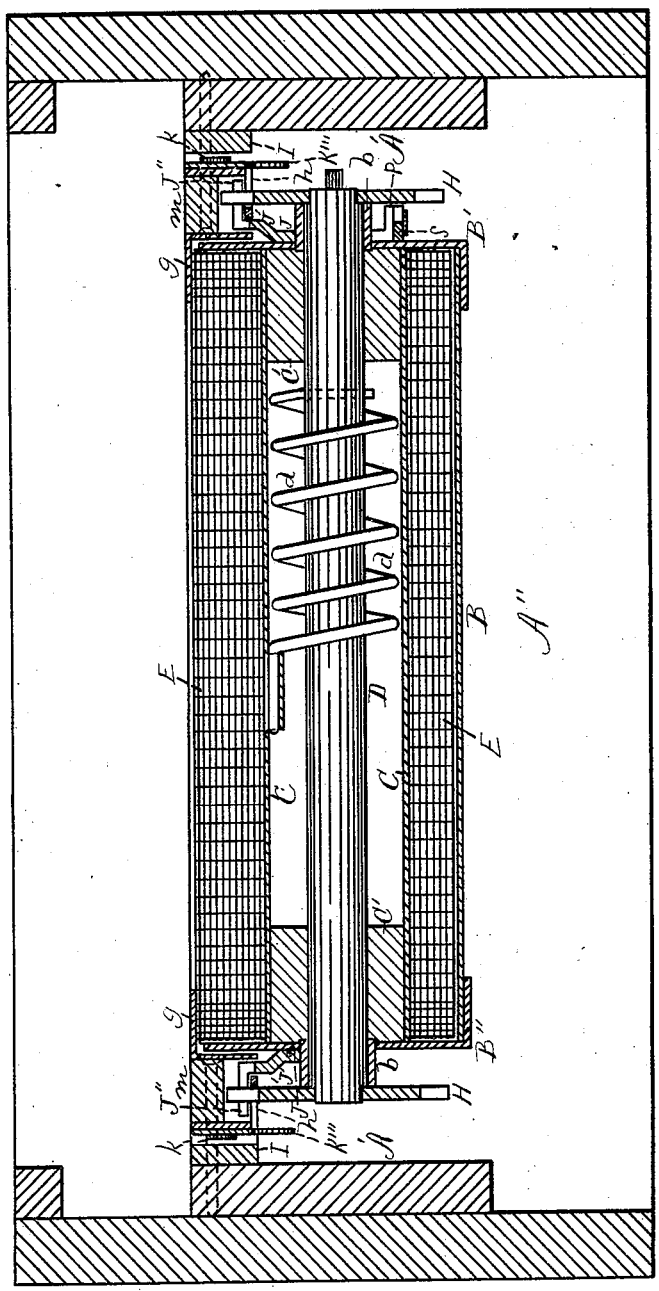
Figure 4:
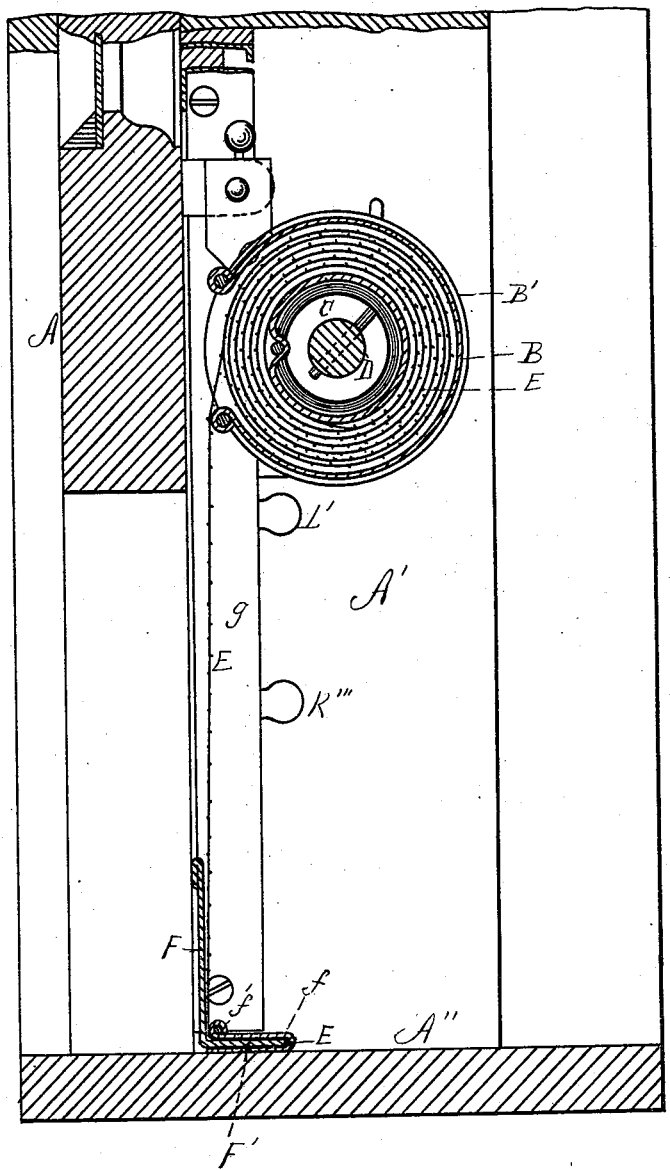

Figure 1 is a front elevation of portions of a window-frame and lower sash with my improved window-screen applied thereto and the sash partly raised. Fig. 2 is a plan view of my device in position, the sash being shown in horizontal section. Fig. 3 is a central horizontal section of the device, the minor shaft and spring being shown in plan. Fig. 4 is a vertical section taken transversely with the casing of the window-screen, the position being the same as indicated in Fig. 1. Fig. 5 is an elevation of the right end of the roll or casing, a portion of the sash being shown in vertical section. Fig. 6 is a similar view showing the operation of the key. Fig. 7 is an inside enlarged elevation of the rack $h$ which is next the left jamb looking from the inside of the window, illustrating the slide and swinging locking-arm, whereby the cylinder is detachably held in position. Fig. 8 is a similar view with the slide and swinging arm raised.

Similar letters of reference indicate corresponding parts.

A represents a portion of the lower sash of a window, A' the jambs, and A" the sill, all constructed as usual.

B is a cylindrical casing substantially like that shown in the patent application above referred to, and provided at its ends with caps B' B", supporting bearings $b$, Fig. 3, for the minor shaft D. The major or hollow shaft C is secured to the bushings C', and the two shafts are connected by the spring $d$, none of the above being new in this invention.

E is the netting, one end of which is rigidly secured to the hollow shaft C, while the other end extends down to a foot-piece, which consists of the vertical plate F, Fig. 4, bent forward or inward into the horizontal portion F'. A folded plate or clamp $f$ embraces the portion F' and is formed into a curved lip at $f'$. The lower end of the netting extends down in front of the vertical plate F and between the same and the lip $f'$, thence under the upper fold of the clamp and between it and the portion F' of the plate F, and thence under said portion F' and between it and the under fold of the clamp $f$. Thus the lower edge of the netting is securely clamped, is prevented from turning a sharp corner by means of the curved lip $f'$, is supported by the plate F for a short distance, and is readily removed by removing the spring-clamp $f$.

Suitable gear wheels or pinions H are fast on the opposite ends of the shaft D, and engage in the openings or sockets $h'$, formed in the vertical racks $h$, (not new in this invention,) supported by the jambs. In order to fit the device with exactness to window-casings having different thicknesses of bead, I not only make the rolls or casings of different lengths, but also provide filling-strips made of wood of differents thicknesses, such filling-strips being intended to set next the jamb and between it and the rack. Strips of this character are shown at I, and the racks $h$ and guides $g$ are screwed or otherwise secured to the jambs through said filling-strips. Thus while a number of sizes are provided for different window-casings, the exact adjustment to individual thicknesses of beads may be effected by the use of the filling-strips.

The caps B B' are provided on their upper ends with vertically-set brackets J, each of which is bent outward at J', Fig. 2, so as to set off from the cap, and is provided with two outwardly-projecting horizontal slides J''. The portion formed by the bend J' extends between the guide or guard $g$ and the inner edge of the rack $h$, while the slides J'' project and move vertically behind said rack and between it and the vertical strip $m$. As the rack does not extend entirely to the bottom of the sash, (see Figs. 1 and 7,) there is ample opportunity to place the cylinder in position beneath the racks, so that the slides J'' can move up behind them. The rear surface of each rack $h$—that is to say, the surface between the rack and the filling-strip I—is provided with headed pins $k$, which extend into vertical slots K', formed in the slides K. The lower end of each slide has a suitable notch $k'$ for the accommodation of a fastening-screw at that point, and the upper ends of the slots K' are preferably curved forward at K'', Fig. 8, for the guidance of the downward movement of the slides rearward to accommodate said screws. Each slide is provided with a suitable handle K''', which extends out parallel with the jamb. Pivotally hung at $l$ to the rack $h$ above the slide is a swinging arm L, provided with a suitable handle L'. When the cylinder and screw are to be placed in position, the locking-arm L is swung up and the slide K raised, as shown in Fig. 8, thus allowing the slides J'' to move into position. Then the slides K are pushed down, as indicated in Fig. 7, and held there by the locking-arms L. As the sash is raised, drawing with it the cylinder, the slides J'' move, as above described, while the opposite ends of the foot-piece F F' are prevented from rising by the strips $m$, and from swinging out by the inward bends or folds K'''', Fig. 1, extending from the slides K in front of the opposite ends of said foot-piece.

The bracket J, which is secured to the cap B' on the right end of the cylinder, is formed into an outwardly-projecting horizontal lip P, Figs. 1, 3, 5, and 6, and to this lip is pivoted a locking-arm S, which is formed, as shown, with the shoulder S', and whose upper end S'' extends up from said shoulder on a line which is at the right of the line of the main portion S. This locking-arm is adapted, by being swung outward, to engage, by means of its shoulder S', the gear-wheel H and prevent its rotation, while when swung inward it lies against the cap B' and is held in such position by friction against a projection or lip P', which extends from the bracket J nearly over the lip P. When the spring $d$ is to be tightened, the arm S is swung back out of engagement with the gear-wheel H, and when the tension is sufficient it is locked by swinging the arm again into engagement with the gear-wheel.

A suitable key for holding or rotating the gear-wheel when the locking-arm is out of engagement therewith is shown in Fig. 6 in position for use, with its end U lying under the shaft of the gear-wheel, while a suitable projection engages one of the teeth. If the cylinder is removed from the window-casing, the gear-wheel can be operated by the points U''', which extend from the handle U' and are adapted to enter the openings H' on the outer face of the gear-wheel.

Having thus fully described my invention, what I claim, and desire to secure by Letters Patent, is—

1. In a window-screen of the character described, the combination with the foot or strip to which the lower edge of the netting is secured, of the slides K adapted to be moved vertically between the window-screen and the jambs and when at their lowest point to hold the said foot down upon the sill, and the swinging stops L pivotally secured in the casing immediately above the slides, whereby said slides may be held down or released as desired, substantially as set forth.

2. In a window-screen of the character described, the slides K provided with the vertical slots K' and handles extending forward into an accessible position, said slides moving vertically between the racks $h$ and the jambs and held in such position by buttons $k$ extending from the former into said slots, and the swinging arms L pivotally hung from the racks and adapted in their normal position to act as stops for the slides whereby said slides are held down upon the foot of the netting, substantially as described.

3. In a window-screen of the character described, the combination with the major and minor shafts C D, spring $d$, gear-wheel H on the minor shaft, and cap B on the cylinder; of the bracket or plate J rigid with the cap, said plate being formed up into the lips P P', and the lever S pivoted to the lower lip P and bearing against the upper lip P', said lever being formed with the shoulder or elbow S' for engagement with said gear-wheel, and said lever swinging at right angles with the plane of the gear-wheel, substantially as set forth.

4. In a window-screen of the character described, in combination, the spring-clamp $f f'$ bent into two horizontal parallel folds as described, the angle-shape foot consisting of the vertical plate F and the horizontal base portion F' extending centrally into said clamp between its two horizontal folds, and the netting E extending down in front of the vertical portion F of the angle-plate, between the horizontal portion F' of said plate and the upper fold of the clamp $f$, around the front edge of said portion F' and back between the said horizontal portion F' and the under fold of the plate $f$, substantially as described.

JAMES ALLEN CROCKER.

Witnesses:
 HENRY W. WILLIAMS,
 A. N. BONNEY.